United States Patent
Ikegami

(10) Patent No.: US 11,410,286 B2
(45) Date of Patent: Aug. 9, 2022

(54) INFORMATION PROCESSING APPARATUS, SYSTEM, METHOD FOR CONTROLLING INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Hideyuki Ikegami, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 103 days.

(21) Appl. No.: 16/705,661

(22) Filed: Dec. 6, 2019

(65) Prior Publication Data
US 2020/0193585 A1    Jun. 18, 2020

(30) Foreign Application Priority Data
Dec. 14, 2018 (JP) .............................. JP2018-234705

(51) Int. Cl.
*G06T 7/00* (2017.01)
*G06T 7/254* (2017.01)
(Continued)

(52) U.S. Cl.
CPC .......... *G06T 7/0002* (2013.01); *G06N 20/00* (2019.01); *G06T 3/40* (2013.01); *G06T 5/50* (2013.01);
(Continued)

(58) Field of Classification Search
CPC . G06N 3/08; G06N 20/00; G06T 3/40; G06T 5/003; G06T 5/50; G06T 7/0002;
(Continued)

(56) References Cited

U.S. PATENT DOCUMENTS 10,147,216 B1 *  12/2018  Miao ....................... G06T 7/194
2008/0101728 A1 *  5/2008  Vitsnudel .............. G06T 11/001
382/317

(Continued)

FOREIGN PATENT DOCUMENTS

JP          2011087090 A      4/2011

OTHER PUBLICATIONS

Purohit, et al., "Learning Based Single Image Blur Detection and Segmentation," 2018 25th IEEE International Conference on Image Processing (ICIP), 2018, pp. 2202-2206, doi: 10.1109/ICIP.2018.8451765. (Year: 2018).*

(Continued)

*Primary Examiner* — Emily C Terrell
*Assistant Examiner* — Molly Wilburn
(74) *Attorney, Agent, or Firm* — Carter, DeLuca & Farrell LLP

(57) ABSTRACT

An information processing apparatus determines, for an image to be processed including a first region having a first image quality and a second region other than the first region having a second image quality lower than the first image quality, whether or not a difference in image quality between the first image quality and the second image quality is equal to or larger than a predetermined value, converts, in a case where the determination unit determines that the difference between the first image quality and the second image quality is equal to or larger than the predetermined value, the image of the second region into an image having a third image quality higher than the second image quality, and generates a combined image by using the post-conversion image having the third image quality and the image of the first region.

11 Claims, 13 Drawing Sheets

(51) Int. Cl.
  *G06T 3/40*  (2006.01)
  *G06N 20/00*  (2019.01)
  *G06T 5/50*  (2006.01)

(52) U.S. Cl.
  CPC .... *G06T 7/254* (2017.01); *G06T 2207/20016* (2013.01); *G06T 2207/20081* (2013.01); *G06T 2207/20224* (2013.01)

(58) Field of Classification Search
  CPC ........... G06T 7/254; G06T 2207/20081; G06T 2207/20016; G06T 2207/20224; G06T 2207/30232; G06T 2207/20084; G06T 2207/20212; G06T 2207/20021; G06T 2207/20012
  See application file for complete search history.

(56) References Cited

U.S. PATENT DOCUMENTS

| | | | |
|---|---|---|---|
| 2009/0096897 A1* | 4/2009 | Saito | H04N 5/232945 348/241 |
| 2010/0259631 A1* | 10/2010 | Sugita | H04N 5/235 348/222.1 |
| 2011/0007186 A1* | 1/2011 | Yonaha | H04N 7/183 348/E5.051 |
| 2014/0086486 A1* | 3/2014 | Pillman | G06T 5/003 382/173 |
| 2017/0069068 A1* | 3/2017 | Chang | G06T 5/008 |
| 2020/0145583 A1* | 5/2020 | Shanmugam | H04N 5/2625 |

OTHER PUBLICATIONS

Isola et al., "Image-to-Image Translation with Conditional Adversarial Networks," Berkeley AI Research (BAIR) Laboratory, University of California, Berkeley, Nov. 21, 2016, pp. 1-17.

* cited by examiner

F I G. 2A
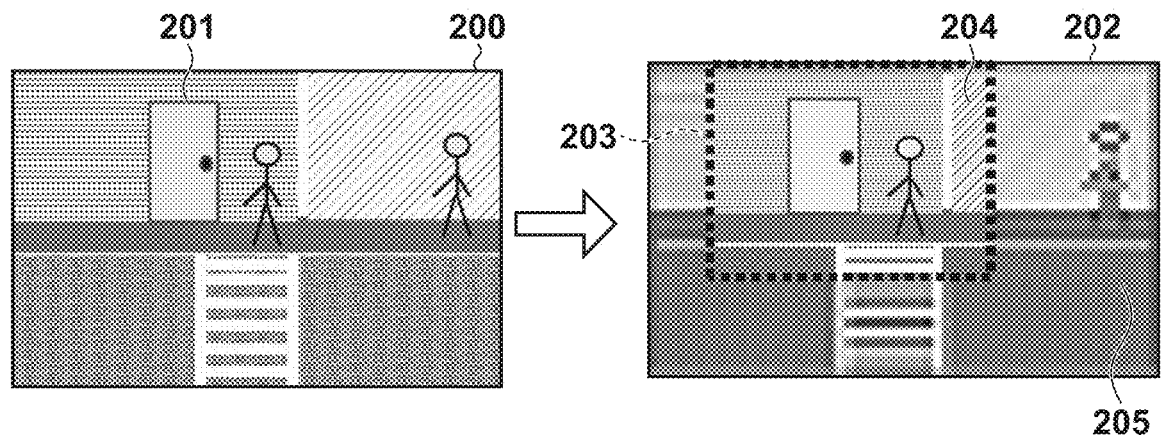
F I G. 2B
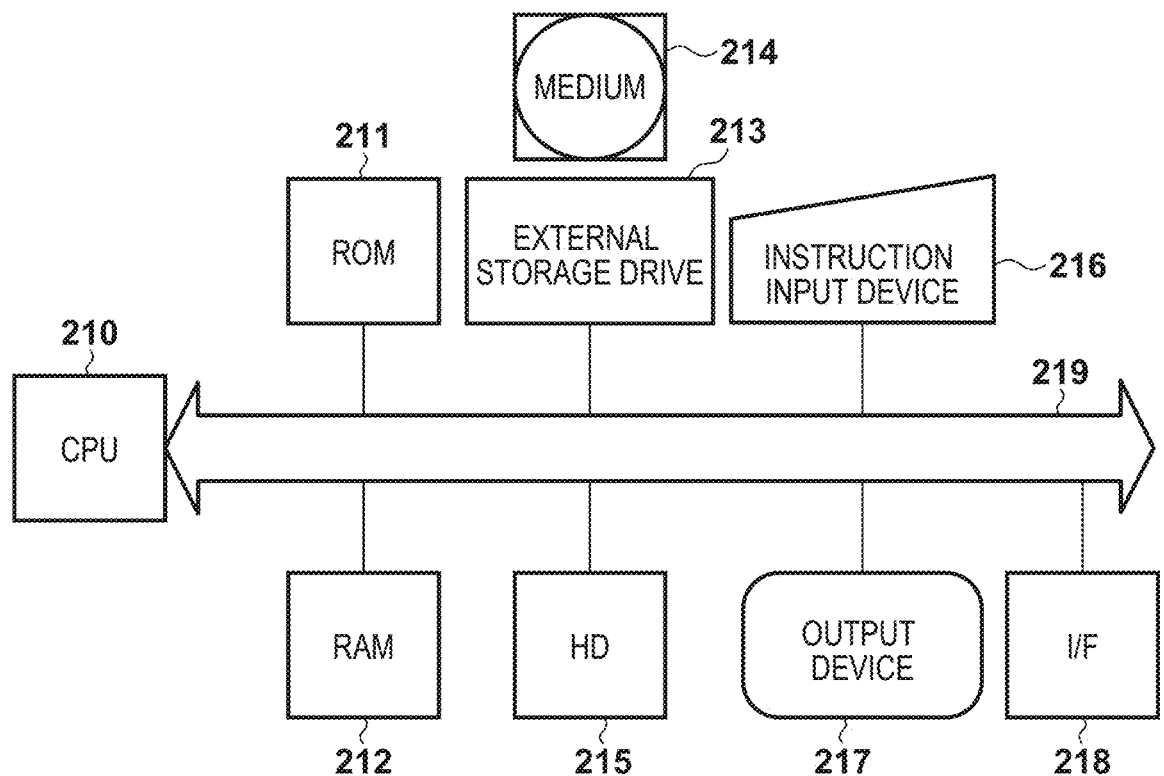

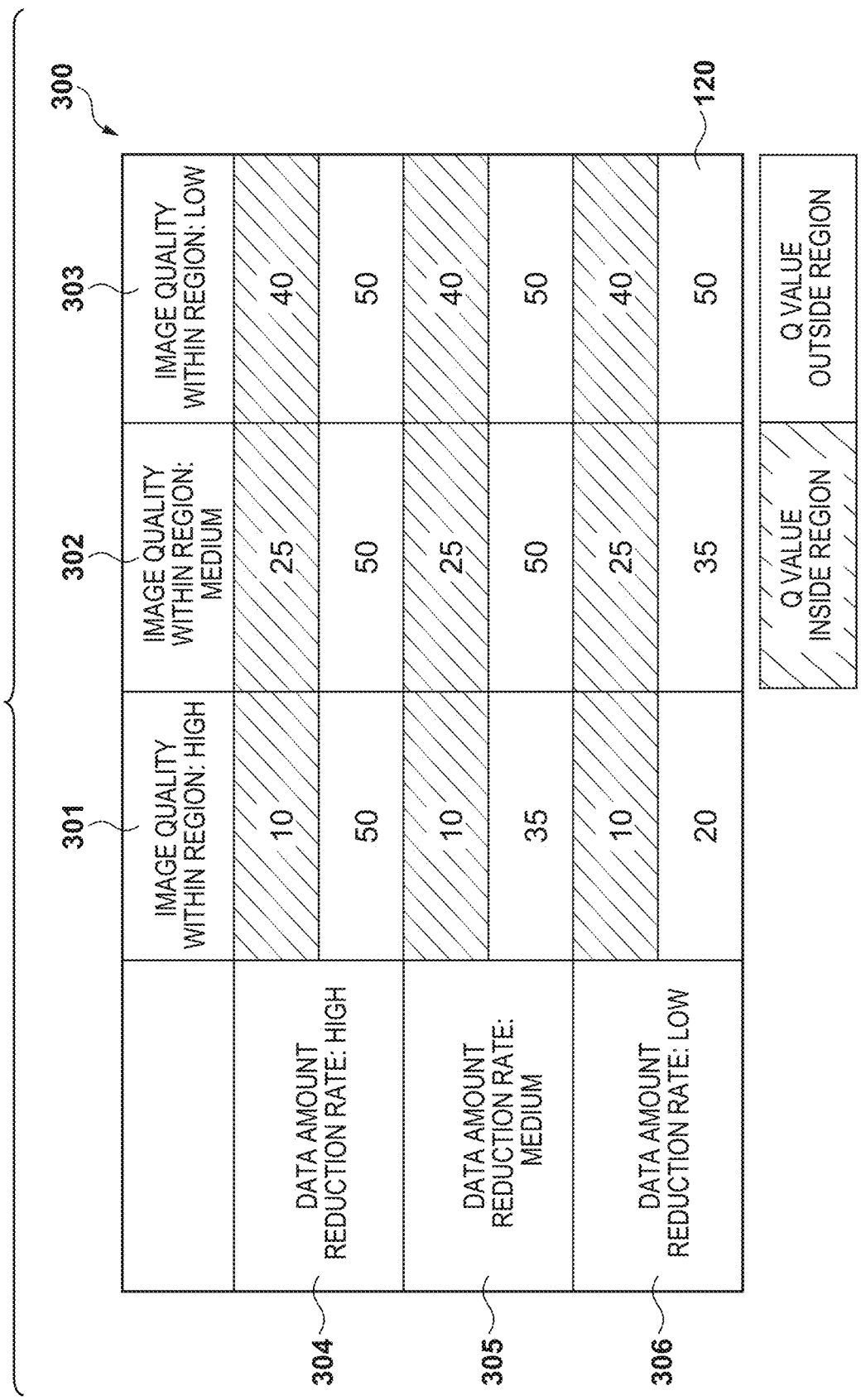

| 401 | 402 | 403 | 404 | 405 | 406 | 407 |
|---|---|---|---|---|---|---|
| PRESENCE OR ABSENCE OF ADSR | ADSR REGION x1 | ADSR REGION y1 | ADSR REGION x2 | ADSR REGION y2 | Q VALUE OF HIGH-QUALITY REGION | Q VALUE OF LOW-QUALITY REGION |
| 1 | 540 | 200 | 840 | 600 | 10 | 50 |

INFORMATION PROCESSING APPARATUS, SYSTEM, METHOD FOR CONTROLLING INFORMATION PROCESSING APPARATUS, AND NON-TRANSITORY COMPUTER-READABLE STORAGE MEDIUM

BACKGROUND OF THE INVENTION

Field of the Invention

The present disclosure relates to an information processing apparatus, a system, a method for controlling an information processing apparatus, and a non-transitory computer-readable storage medium.

Description of the Related Art

In recent years, there have been many network cameras that can efficiently reduce the amount of data distributed by performing distribution of a specific region at a high quality and other regions at a low quality. Examples of such distribution will be described with reference to FIG. 2A. FIG. 2A illustrates an example of an image 200 that is captured at same image quality for the entire angle of view. The image 200 is an image captured by a camera set mainly so as to monitor people entering or leaving a door 201. An image 202 illustrates an example of an image in which a specific region is captured at a high quality and other regions are captured at a low quality for the same angle of view. A frame line 203 indicates the specific region to be captured at high quality. For convenience of description, the frame line is clearly illustrated by a dotted line, but the frame line need not be displayed in the actual image. At this time, an image 204 of the region inside the frame of the frame line 203 is of high quality, and an image 205 of the region outside of the frame is of low quality.

In this manner, by designating in advance an important region for the purpose of monitoring and then generating an image, it is possible to distribute an important region at a high quality and other regions at a low quality, and it is thereby possible to reduce the amount of data of an image that is distributed. This function is referred to herein as ADSR (Area-specific Data Size Reduction) in the present specification. As a network camera for distributing an image using such an ADSR function, Japanese Patent Laid-Open No. 2011-87090 describes a network camera capable of distributing a facial region at a high quality.

However, when the effect of reduction of the amount of data is pursued using the above-mentioned technique, and the quality of the image in the region outside the designated range is further lowered, the difference between the high-quality region and the low-quality region is increased, resulting in that an image that is difficult to view.

SUMMARY OF THE INVENTION

Accordingly, the present invention provides a technique for making an image including a high-quality region and a low-quality region generated by ADSR easier to view even when the image quality difference is large.

One aspect of embodiments relates to an information processing apparatus, comprising, a determination unit configured to, for an image to be processed including a first region having a first image quality and a second region other than the first region having a second image quality lower than the first image quality, determine whether or not a difference in image quality between the first image quality and the second image quality is equal to or larger than a predetermined value, a conversion unit configured to, in a case where the determination unit determines that the difference between the first image quality and the second image quality is equal to or larger than the predetermined value, convert the image of the second region into an image having a third image quality higher than the second image quality, and a combining unit configured to generate a combined image by using the post-conversion image having the third image quality and the image of the first region.

Further features of the present invention will become apparent from the following description of exemplary embodiments (with reference to the attached drawings).

BRIEF DESCRIPTION OF THE DRAWINGS

FIG. 2A is a diagram for describing ADSR.

FIG. 2B is a diagram illustrating a hardware configuration example of an information processing apparatus 120 corresponding to an exemplary embodiment.

FIG. 3 is a diagram illustrating a table for an example of an image quality assignment for the inside and outside of a specific region according to an image quality setting and a data amount reduction rate, corresponding to an exemplary embodiment.

DESCRIPTION OF THE EMBODIMENTS

Figure 1:
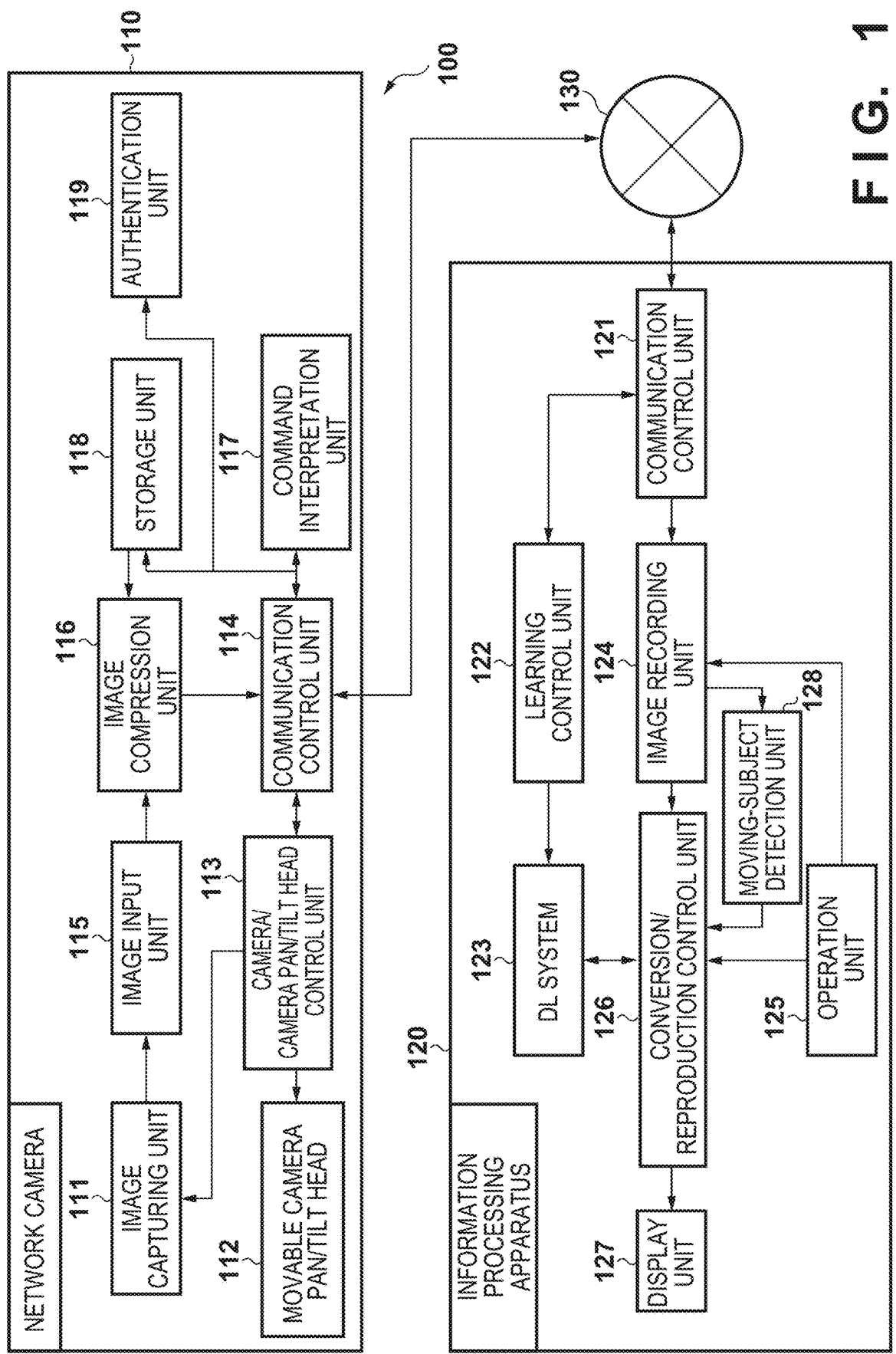
FIG. 1 is a diagram illustrating a configuration example of a monitoring system 100 corresponding to an exemplary embodiment.

Hereinafter, exemplary embodiments will be described in detail with reference to the accompanying drawings. FIG. 1 is a block diagram illustrating a configuration of a monitoring system corresponding to an exemplary embodiment. In FIG. 1, a monitoring system 100 is configured by connecting a network camera 110 and an information processing apparatus 120 via a network 130. Although the number of each device connected to the network 130 is not limited, it is assumed that one of each device is connected to the network 130 for simplicity of description.

The network 130 may be any type of digital network, such as the Internet or an intranet, having a bandwidth sufficient for a camera control signal or a compressed image signal, which will be described later. Note that the TCP/IP (UDP/IP) protocols are assumed as the network protocols, and what is referred to below as an address should be assumed to indicate an IP address. It is also assumed that the network camera 110 and the information processing apparatus 120 are both assigned an IP address.

The network camera 110 is configured to include, for example, an image capturing unit 111, a movable camera pan/tilt head 112, a camera/camera pan/tilt head control unit 113, a communication control unit 114, an image input unit 115, an image compression unit 116, a command interpretation unit 117, a storage unit 118, and an authentication unit 119. Based on this configuration, the network camera 110 performs various camera controls while the communication control unit 114, in response to commands received from an external client device via the network 130, captures a predetermined space to be monitored, and distributes captured images via the network 130.

For example, in addition to still images, the image capturing unit 111 can acquire images at 30 frames per second and acquire a 30 fps moving image (live image) of a monitoring region. The image capturing unit 111 includes an image capturing device such as a CMOS for photoelectrically converting an optical image formed on an image capturing surface and outputting an analog image signal, and an A/D converter for converting an analog image signal into a digital image signal. Also, the image capturing unit 111 includes a development processing unit for performing predetermined development processing on the digital image signal. The development processing may include, for example, de-Bayer processing, white balancing processing, tone conversion processing, edge-emphasis correction processing, flaw correction, de-noising, enlargement/reduction processing, processing for color conversion to a YCbCr format, and the like. The image after development processing is output to the image input unit 115.

The movable camera pan/tilt head 112 can change the capturing direction (pan/tilt angle) by the image capturing unit 111 based on the control by the camera/camera pan/tilt head control unit 113. The camera/camera pan/tilt head control unit 113 controls the pan/tilt angle of the image capturing unit 111 by the movable camera pan/tilt head 112 in accordance with control details designated by a command from the information processing apparatus 120 and interpreted by the command interpretation unit 117. The communication control unit 114 is a communication interface for communicating with the information processing apparatus 120 via the network 130.

The image input unit 115 is an input interface for acquiring an image captured by the image capturing unit 111, and the image input unit 115 retrieves the entire image in the case of an entire image, and retrieves a portion of the image in the case of a cut-out image. The image compression unit 116 compresses and encodes an image input from the image input unit 115 to generate image data for distribution. Image-compression schemes for distribution may be based on standards such as H.264, H.265, MJPEG or JPEG, for example. Further, image data of any format including mp4 image data, avi image data, or the like may be generated. The image compression unit 116 acquires a set value from the storage unit 118, and performs control to change a compression ratio, and compress a specific region at a high quality, and compress other regions at a low quality. In the present embodiment, H.264 compression is assumed as the compression format for the image, but embodiments are not limited to this compression format.

The command interpretation unit 117 interprets commands received by the communication control unit 114 from the information processing apparatus 120, and controls the operation of each block. The storage unit 118 holds various setting values and data, and the authentication unit 119 determines whether or not authentication is permitted based on authentication information received by the communication control unit 114 from the information processing apparatus 120. In the present embodiment, the type of the user of the monitoring system 100 may be "guest" and may be "administrator", but the operations that are permitted for the guest and for the administrator are different from each other. The authentication unit 119 determines whether the user is an administrator or a guest based on a character string and a password inputted by the user, and only permits the administrator to execute processing and functions that are based on operations allowed by the administrator.

The information processing apparatus 120 is configured to include a communication control unit 121, a learning control unit 122, a DL (Deep Learning) system 123, an image recording unit 124, an operation unit 125, a conversion/reproduction control unit 126, a display unit 127, and a moving-subject detection unit 128. The information processing apparatus 120 can also be realized as an arbitrary information processing terminal such as a personal computer (PC), a mobile phone, a smart phone, a PDA, a tablet terminal, or an image processing apparatus (which can also be referred to as an image generating apparatus or an image combining apparatus).

The communication control unit 121 is a communication interface for communicating with a network camera 110 via the network 130. The learning control unit 122 performs a process for passing learning data to the DL (Deep Learning) system 123, which will be described later. Deep Learning is a kind of machine learning, and is a technique in which a neural network is structured in a multi-layer manner, and a computer itself obtains features included in data, and accurate and efficient discrimination and generation processing is realized thereby. In this embodiment, Deep Learning is abbreviated to "DL".

In the present embodiment, Deep Learning is used as the machine learning method, but the present invention is not limited thereto, and other machine learning methods are also applicable. The DL system 123 performs machine learning based on the learning data provided from the learning control unit 122, and performs image quality conversion processing for an image corresponding to the present embodiment using the result of the machine learning (learned model). In the present embodiment, it is assumed that pix2pix is used as a concrete method of DL. pix2pix is described in detail in Image-to-Image Translation with Conditional Adversarial Networks, Nov. 21, 2016, Phillip Isola, Jun-Yan Zhu, Tinghui Zhou, and Alexei A. Efros. However, the method of realizing the DL system is not limited to pix2pix.

The image recording unit 124 records images (moving images and still images) received from the network camera 110 via the communication control unit 121. The operation unit 125 is a user interface for accepting an input from a user. By operating the operation unit 125, the user can make recording settings for the image recording unit 124, and can make settings related to conversion processing for the conversion/reproduction control unit 126. The conversion/reproduction control unit 126 converts the quality of the image recorded in the image recording unit 124 based on the user input information accepted from the operation unit 125, and outputs the converted quality to the display unit 127. Specifically, there are cases where an image recorded in the image recording unit 124 is output as is to the display unit 127, and there are cases where a high-quality portion of an image recorded in the image recording unit 124 and a low-quality portion that has been subjected to high-quality conversion by the DL system 123 are combined and output to the display unit 127. The moving-subject detection unit 128 detects a moving subject in an image recorded in the image recording unit 124, and notifies the conversion/reproduction control unit 126 of information about the detected moving subject.

Next, with reference to FIG. 2B, a hardware configuration example of an information processing apparatus 120 corresponding to an exemplary embodiment will be described. Next, FIG. 2B is a block diagram illustrating an example of a hardware configuration of the information processing apparatus 120. The hardware configuration may be made to be similar or equivalent to configurations of the network camera 110, which is the above-described information processing apparatus, except for the image capturing unit 111, the movable camera pan/tilt head 112.

In FIG. 2B, a CPU 210 executes application programs, an operating system (OS), control programs, and the like stored in a hard disk drive (hereinafter referred to as an HD) 215, and performs control to temporarily store information, files, and the like required to execute the programs in the RAM 212. In addition, the CPU 210 can function as the DL system 123, and perform machine learning based on learning data provided from the learning control unit 122, and execute image quality conversion processing corresponding to the present embodiment for images recorded in the image recording unit 124. Further, the CPU 210 controls communication with the network camera 110 via an interface (I/F) 218. The processes in the flowcharts of FIG. 10 and FIG. 13, which will be described later, are also realized by the CPU 210 controlling the entire device by executing corresponding processing programs.

In addition to a basic I/O program, the ROM 211 internally stores various data such as application programs for executing predetermined processing. The RAM 212 temporarily stores various data, and functions as a main memory, a work area, and the like for the CPU 210. In addition, the RAM 212 temporarily stores information received from the network camera 110.

An external storage drive 213 is an external storage drive for realizing access to a recording medium, and can load a program or the like stored in a medium (a recording medium) 214 into the computer system. As the medium 214, for example, a floppy (registered trademark) disk (FD), a CD-ROM, CD-R, CD-RW, a PC card, a DVD, a Blu-ray (registered trademark), an IC memory card, an MO, a memory stick, or the like can be used.

An external storage device 215 uses an HD (hard disk) functioning as a large-capacity memory in the present embodiment. The HD 215 stores application programs, an OS, control programs, related programs, images received from the network camera 110, and the like. Instead of the hard disk, a nonvolatile storage device such as a flash (registered trademark) memory may be used.

An instruction input device 216 corresponds to a keyboard, a pointing device (such as a mouse), a touch panel, or the like. An output device 217 outputs a command inputted from the instruction input device 216, a response output of the information processing apparatus 120 to the command, or the like. The output device 217 may include a display, a speaker, a headphone terminal, and the like. A system bus 219 controls a flow of data in the information processing apparatus 120.

The interface (hereinafter referred to as I/F) 218 plays a role of mediating the exchange of data with an external device. In particular, the I/F 218 may include a radio communication module, and the module may include well-known circuitry mechanisms including antenna systems, RF transceivers, one or more amplifiers, tuners, one or more oscillators, digital signal processors, CODEC chipsets, subscriber identification module cards, memories, or the like. The I/F 218 may also include a wired communication module for a wired connection. The wired communication module enables communication with other devices via one or more external ports. It may also include various software components for processing data. The external ports are coupled to other devices via Ethernet, USB, IEEE1394, or the like, directly or indirectly via a network. It should be noted that software that realizes functions equivalent to those of the above-described devices can be configured to be used as a substitute for hardware devices.

Every time a corresponding program is operated to execute a process corresponding to the present embodiment, the program may be loaded into the RAM 212 from the HD 215 in which the program has been previously installed. In addition, the programs according to the present embodiment can be recorded in the ROM 211, configured to form a portion of a memory map, and executed directly by the CPU 210. In addition, the corresponding programs and related data may be directly loaded into the RAM 212 from the medium 214 and executed.

Next, an example of image quality setting in the network camera 110 of the present embodiment will be described with reference to FIG. 3. In the present embodiment, a case will be described in which a region of a specific portion (hereinafter, referred to as a "specific region" or a "first region") of an image obtained by capturing a monitoring region by the image capturing unit 111 is compressed and encoded at a high quality, and another region (hereinafter, referred to as a "region outside the specific region" or a "second region") is compressed and encoded at a low quality, and is transmitted to the information processing apparatus 120. FIG. 3 is an example of a table indicating, for image qualities and data amount reduction rates that are set, image qualities (Q values) of the region within the specific region and the region outside the specific region in the image to be processed. In the present embodiment, the user, using the information processing apparatus 120, can set, using a predetermined setting screen, an image quality of an image belonging to a specific region set for an image to be processed.

In the present embodiment, the quality of the image within the specific region of the image to be processed can be set to three levels, for example, high quality, medium quality, and low quality. Also, the reduction rate of the data amount can be set at three levels (high, medium, and low). As a result, there are nine setting patterns. In the table 300, the image quality (first image quality) within the specific region and the image quality (second image quality) outside the specific region are registered for each combination of the image quality and the data amount reduction rate. The image qualities are registered as Q values, and a Q value when the image quality is the highest is 10 and a Q value when the image quality is the lowest is 50. Here, the Q value expresses higher image quality/lower compression the smaller the numerical value indicating the image quality is.

In the table 300, when the image quality within the specific region is set to high quality, the Q values within the specific region are all set to 10. Similarly, in the case of medium quality and low quality, the values of, respectively, 25 and 40 are set uniformly. In the present embodiment, the image quality in the specific region is determined according to the setting content of the image quality within the region.

On the other hand, the image quality outside the specific region is set based on the data amount reduction rate and the image quality within the region. More specifically, when the data amount reduction rate is set to high, the Q value outside the specific region is uniformly set to 50 indicating the lowest image quality. In addition, for the medium and low data amount reduction rates, respectively predetermined values may be added to the image quality within the specific region, with an upper limit value being 50. In the table 300, when the data amount reduction rate is medium, 25 is added, and when the data amount reduction rate is low, 10 is added. In the above description, the assignment of the Q values are merely examples, and the embodiment is not limited to these.

Figures 4A, 4B:
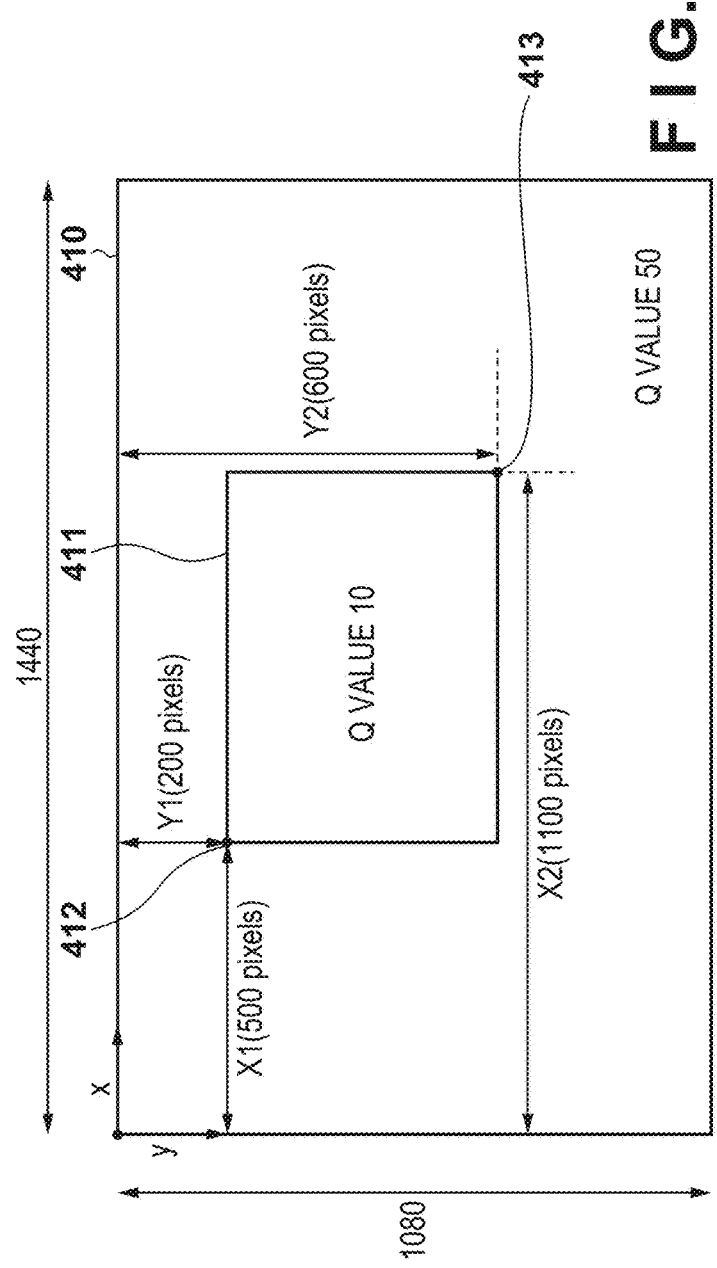
FIG. 4A is a diagram illustrating a data structure example for header information corresponding to an exemplary embodiment.
FIG. 4B is a diagram for describing an example of a configuration of an image according to an exemplary embodiment.

Next, referring to FIG. 4A and FIG. 4B, a data structure for images distributed in a distribution using ADSR will be described. The network camera 110 transmits header information 400 as illustrated in FIG. 4A to the information processing apparatus when distribution is started. The header information 400 includes a flag 401 indicating the presence or absence of ADSR, coordinate values 402 to 405 indicating the ADSR region, that is, the range of the above-described specific region, a Q value 406 of a high-quality region, and a Q value 407 of a low-quality region.

When the value of the flag 401 is 1, it is understood that the ADSR in which the specific region is set to a high quality and other regions outside the specific region are set to a low quality is performed. Since the ADSR is not performed if the value of the flag 401 is 0, the image can be displayed as is without image quality conversion. The coordinate values 402 to 405 are coordinate values for specifying the position and size of the high quality specific region in the image, and the region 411 indicates the specific region in the image 410 as illustrated in FIG. 4B. The coordinates of the upper left point 412 of the region 411 and the coordinates of the lower right point 413 allow the position and size of the region 411 in the image 410 to be specified. For the image 410, the x-axis in the horizontal direction and the y-axis in the vertical direction are set with the upper left as the origin, and coordinate values are determined in units of one pixel.

In the present embodiment, a case in which 1440 pixels are arranged in the x-axis direction and 1080 pixels are arranged in the y-axis direction is assumed. FIG. 4B illustrates the case where the specific region 411 is specified based on the pixel where (x, y)=(500, 200) and the pixel where (x, y)=(1100, 600). In the examples illustrated in FIG. 4B, the size of the specific region is 600×400 pixels.

The Q value 406 indicates the image quality of the image in the region 411, and the Q value 407 indicates the image quality of the region outside the region 411 in the image 410. These values are selected from any of the combinations illustrated in the table 300 of FIG. 3.

Next, the operation of the DL system 123 corresponding to the present embodiment will be described with reference to FIG. 5 to FIG. 7. In the present embodiment, the DL system 123 uses pix2pix. pix2pix is something that learns, in pairs, images of two attributes (specifically, images of an attribute of a generation source and an images of an attribute to be generated), and that learns a technique for converting image quality, so that it becomes able to generate an image of an attribute to be generated if an image of a similar attribute to the generation source is inputted. The pix2pix enables, for example, generation of a map from an aerial photograph, generation of an aerial photograph from a map, generation of a photograph from a line drawing, generation of a color photograph from a black and white photograph, and the like. In the present embodiment, the DL system 123 is constructed to be capable of generating a high-quality image from a low-quality image portion using a learned model that was learned by learning pairs of low-quality images and high-quality images obtained by capturing the same subject. As the low quality images, for example, low quality images obtained by compressing high quality images may be used. By this DL system, it is possible to acquire a high-quality image by processing a low-quality image outside the specific region.

In the present embodiment, the DL system 123 performs learning in advance in order to be able to generate a high-quality image from a low-quality image. An example of learning in the DL system 123 will be described with reference to FIG. 5 and FIG. 6. FIG. 5 and FIG. 6 are diagrams illustrating examples of learning data used at the time of learning. For the learning data, images obtained by actually capturing a region to be monitored by the network camera 110 are used.

Figure 5:
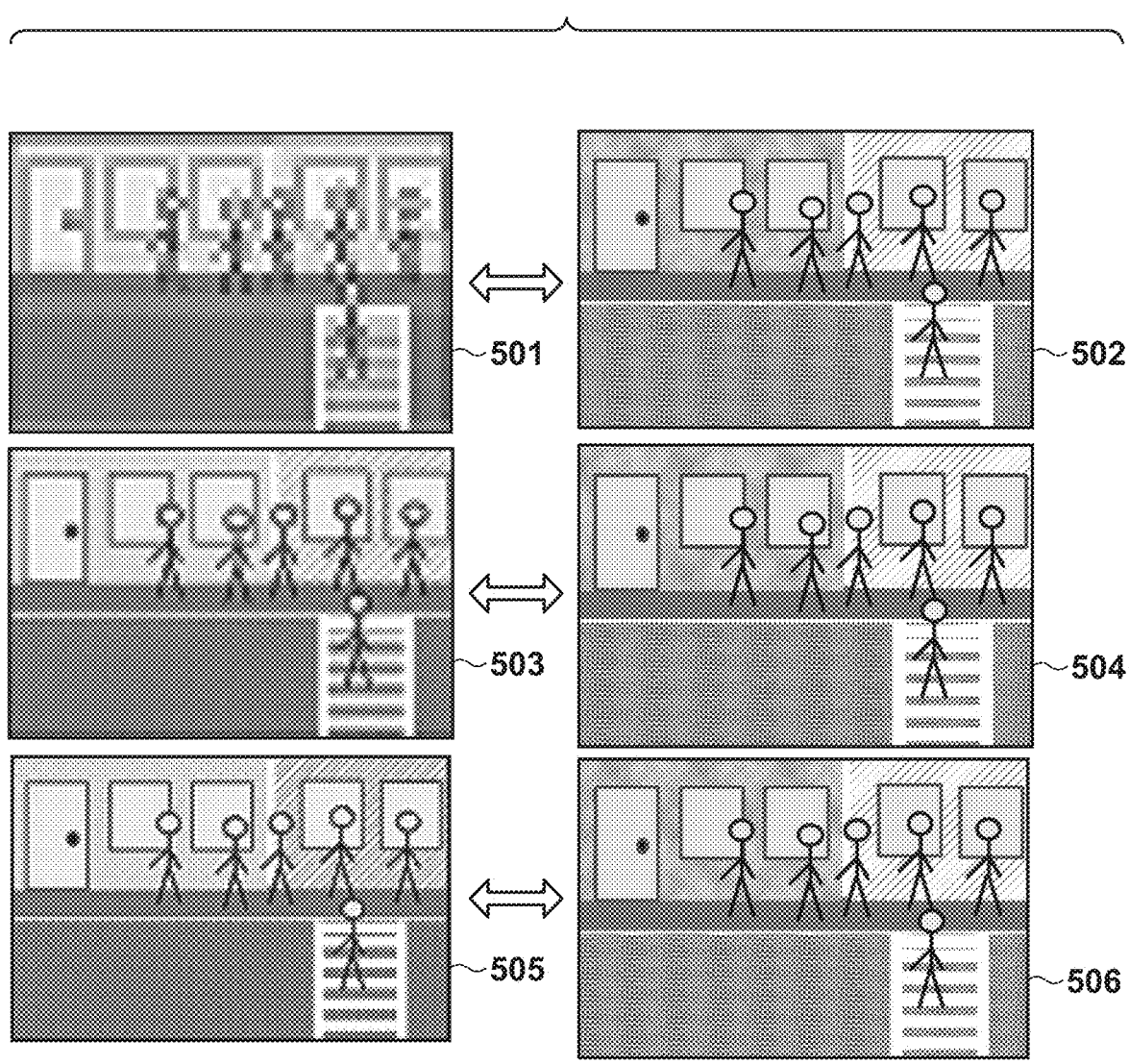
FIG. 5 is a diagram illustrating a learning data example corresponding to an exemplary embodiment.

In FIG. 5, an image 501 and an image 502 are paired images at the same angle of view, and the Q value of the image 501 is 50 and the Q value of the image 502 is 10. Similarly, the pair of images 503 and 504 has Q values of 45 and 10, respectively, and the pair of images 505 and 506 has Q values of 30 and 10, respectively. Here, the Q values of the low quality learning data 501, 503, and 505 of the generation source are set to 50, 45, and 30 in order to improve the quality of the low quality portion in the table 300 of FIG. 3, and the Q values of the high quality learning data 502, 504, and 506 for generation are set to 10 in order to obtain the highest image quality Q value of 10.

In general, in machine learning, the use of more learning data increases the learning accuracy and improves processing performance. Therefore, it is possible to learn, in the same manner, images whose angle of view is that illustrated in FIG. 5 but also those of various angles of view, and even at the same angle of view, learning can be performed under a plurality of different capturing conditions. When a plurality of network cameras 110 are connected to the network 130, learning may be performed for each of the network cameras 110.

Figure 6:
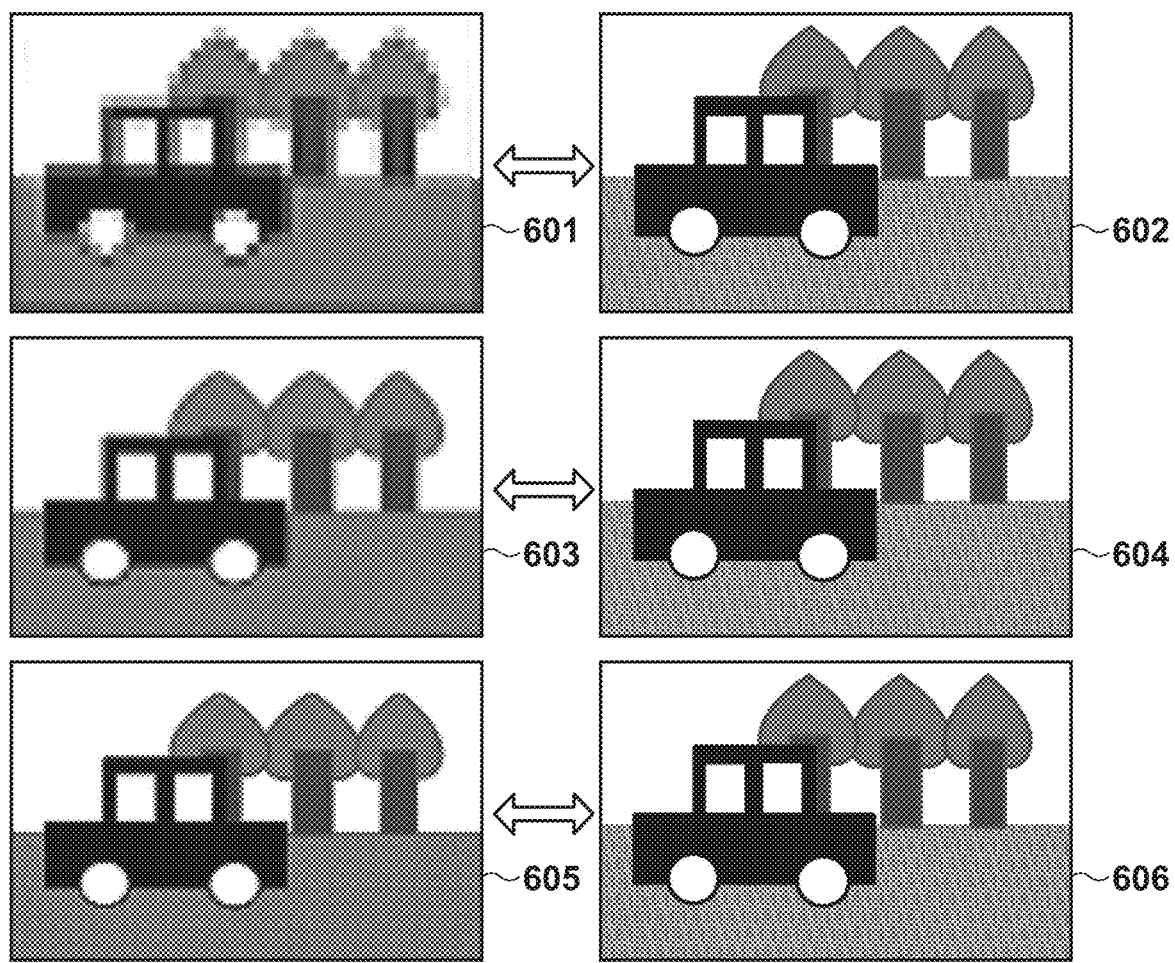
FIG. 6 is a diagram illustrating another learning data example corresponding to an exemplary embodiment.
Figure 7:
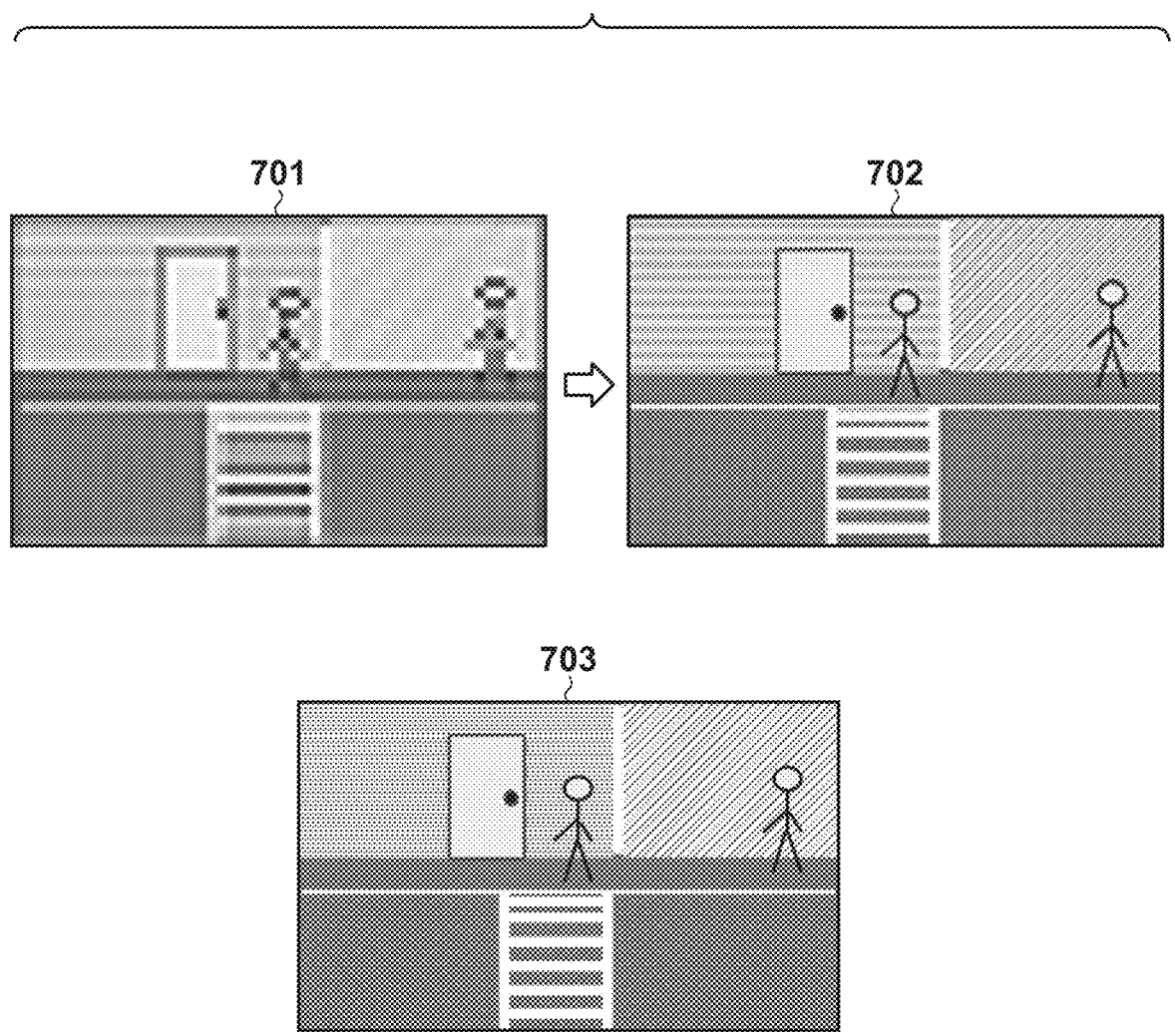
FIG. 7 is a diagram for describing a process in a DL system 123 according to an exemplary embodiment.

FIG. 6 illustrates an example of learning images when capturing is performed at an angle of view different from that of FIG. 5. In FIG. 6, an image 601 and an image 602 are paired images at the same angle of view, and the Q value of the image 601 is 50 and the Q value of the image 602 is 10. Similarly, the pair of images 603 and 604 has Q values of 45 and 10, respectively, and the pair of images 605 and 606 has Q values of 30 and 10, respectively.

In the present embodiment, it is assumed that images captured at 100 different angles of view, and not just the angles of view illustrated in FIG. 5 and FIG. 6 are used as learning data. In addition, since even at the same angle of view, the people or the like who are captured differ depending on the time, the images are further captured at the same angle of view 100 times each at different (shifted) times. This learning can be carried out in about 5 hours at the time of installation. The timing at which the learning is performed is not limited to the time of installation, and may be performed in advance thereof. Since techniques for improving the accuracy in machine learning are known, further detailed description thereof is omitted in the present embodiment.

In the above description, the low quality Q value of the learning data is made to correspond to a Q value registered in the table 300, but the image quality of images used for the learning data does not necessarily have to coincide with a value registered in the table 300.

Next, an example of image generation in the DL system 123 corresponding to the present embodiment will be described with reference to FIG. 7. In FIG. 7, an image 701 is an image of Q value 50 captured by the network camera 110. An example of an image generated by the DL system 123 after the learning described above based on this image is image 702. In this embodiment, the DL system 123 can obtain the high quality image 702 from the low quality image 701 based on the results of learning (the learned model). Here, the image 703 is an image of Q value 10 captured by the network camera 110, but when the image 702 and the image 703 are compared, the quality of the image 702 generated by the DL system 123 is not at the same level as that of the actual captured image 703. Although the level of image quality of the entire image is increased, it is difficult to accurately reproduce the details of a subject or the like. This is similar to other conversion results described in Image-to-Image Translation with Conditional Adversarial Networks, Nov. 21, 2016, Phillip Isola, Jun-Yan Zhu, Tinghui Zhou, and Alexei A. Efros.

However, in the present embodiment, an image to be subjected to resolution conversion is not the important specific region in the monitoring region, but the region outside the specific region in the periphery. Thus, an objective is to alleviate overall viewing difficulty or a visual unnaturalness when the difference between the image quality (first image quality) of a specific region and the image quality (second image quality) of a region outside the specific region is large. Therefore, if the image quality of the image outside the specific region is improved to a higher image quality (third image quality) than the original image quality (second image quality), the objective is achieved even if the quality does not completely match the image quality (first image quality) of the specific region, and it can be considered that local accuracy is not a major problem.

Figure 8A:
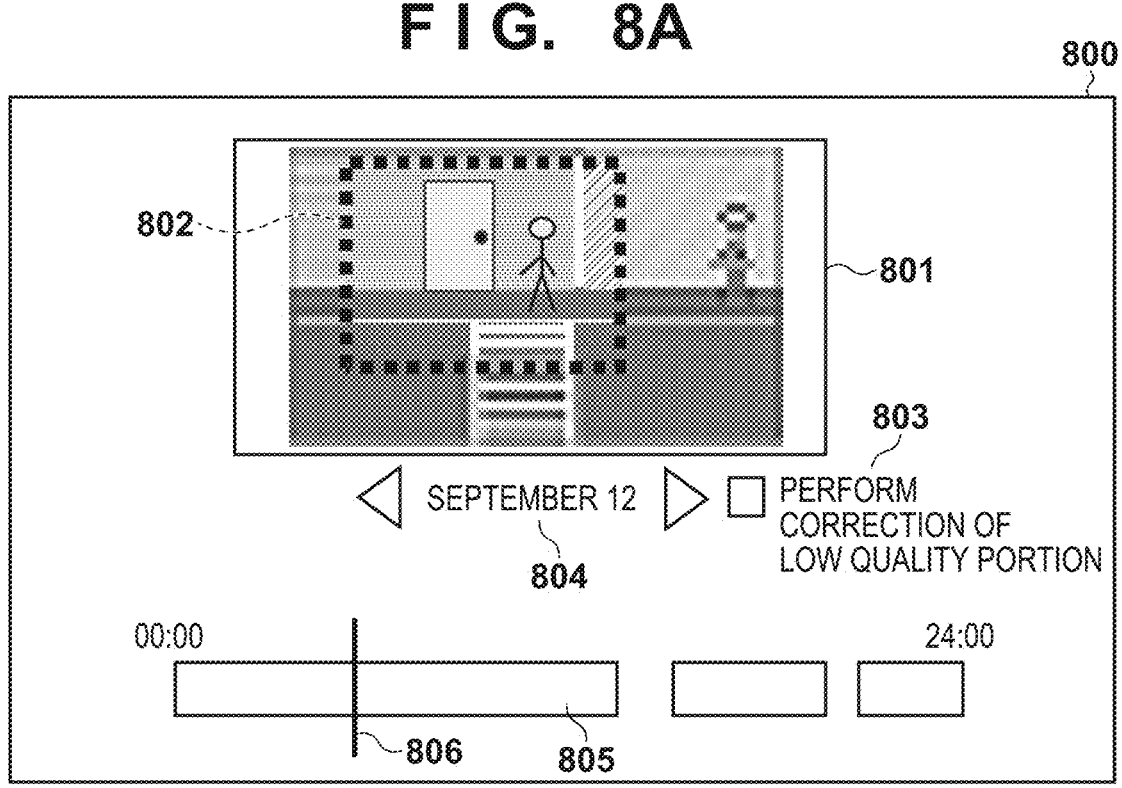
FIG. 8A and FIG. 8B are diagrams for illustrating a setting screen example corresponding to a first embodiment.

Next, referring to FIG. 8A and FIG. 8B, examples of a setting screen for when setting is performed in the information processing apparatus 120, and user operations for performing conversion with the DL system 123 made using the setting screens will be described. In FIG. 8A, the setting screen 800 includes an image display region 801. In the image display region, an image captured by the network camera 110 and recorded in the information processing apparatus 120 is displayed. At this time, a region 802 surrounded by a dotted line corresponds to a specific region displayed at high quality, and a region outside the specific region is displayed at low quality. Although the position of the specific region in the display image is indicated by a dotted line in FIG. 8A, the dotted line need not be displayed in the actual display screen.

In the setting screen 800, a checkbox 803 that can accept designation of whether or not to perform image quality conversion of the low quality portion is displayed, and the user can cause the region outside the specific region to be converted into a high quality image for display by checking the checkbox. The checkbox 803 can be displayed in the case where the ADSR function is used for distribution, that is, when the flag 401 indicating the presence or absence of ADSR in the header information 400 of the FIG. 4A stored in association with a recorded moving image indicates a value of 1. Configuration may be such that when the flag 401 indicates a value of 0, the checkbox is not displayed, or is grayed out so that operations thereon are not accepted. In FIG. 8A, the checkbox 803 is off (unselected/unchecked), and thus image quality conversion processing by the DL system 123 is not performed. The image displayed at this time remains the same as the image recorded in the image recording unit 124.

Figure 8B:
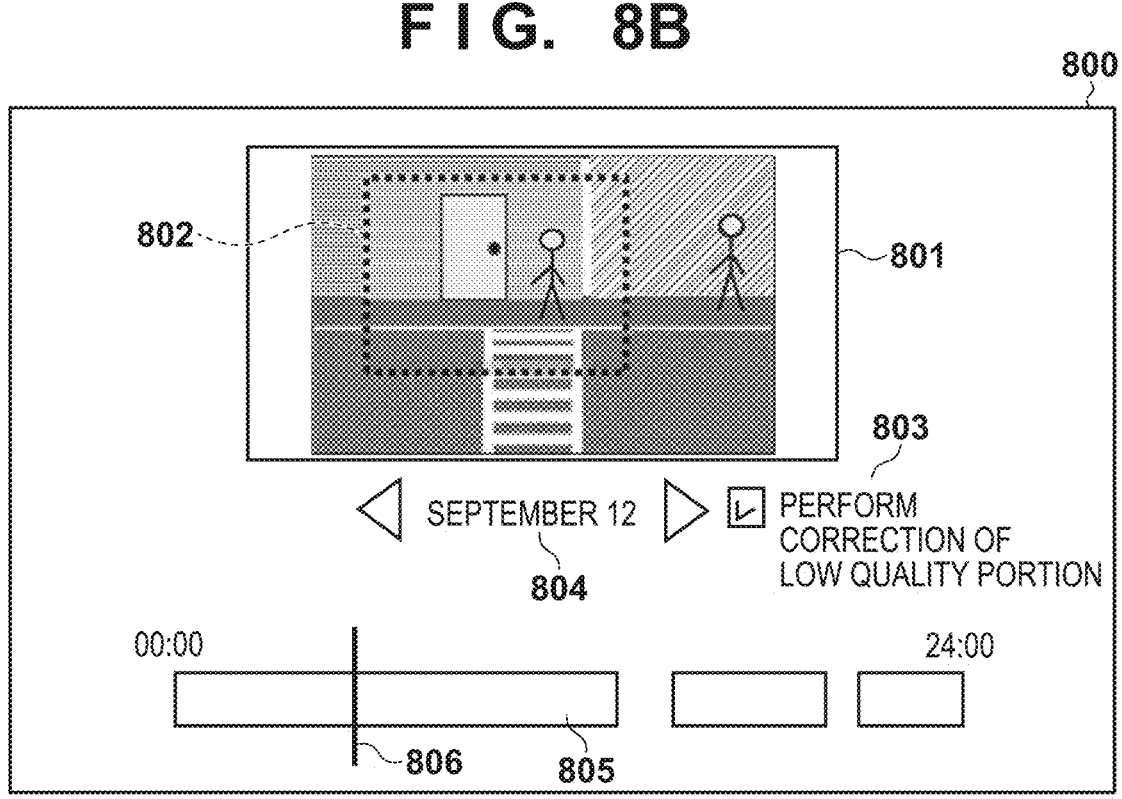

On the other hand, in FIG. 8B, the checkbox 803 is on (selected or checked), and the image outside the region 802 is processed by the DL system 123 to convert it into a high-quality image for display. The image in the region 802 displays the recorded image itself.

The setting screen 800 includes a date display region 804 indicating the date on which the moving image was captured, and the date of the moving image to be displayed can be switched by operating the left and right triangle marks. The date is advanced by operating the mark on the right side, and the date is advanced backwards by operating the mark on the left side. A time period display region 805 indicates the time period over which the moving image was captured on the date designated by the date display region 804. A slide bar 806 indicates a time location of the image displayed in the display region 801, and by moving the slide bar 806 left or right, an image at an arbitrary time location of the captured moving image can be displayed in the display region 801. Although not illustrated in FIG. 8A and FIG. 8B, a reproduction button, a stop button, a pause button, or the like may be displayed.

Next, an example of image conversion processing in the conversion/reproduction control unit 126 corresponding to the present embodiment will be described with reference to FIG. 9. An image 900 is an image for one frame to be processed, and can be regarded as one frame image after decoding the moving image recorded in the image recording unit 124. The image 900 includes a high-quality region 901 and a low-quality region 902. The high-quality region 901 corresponds to the above-mentioned specific region, and the low-quality region 902 corresponds to the region outside of the above-mentioned specific region. The position and size of the high-quality region 901 in the image 900 are specified by the coordinate values 402 to 405 of the ADSR region in the header information 400 illustrated in FIG. 4A.

When the checkbox 803 is set to on in the setting screen 800 of FIG. 8A described above, the conversion/reproduction control unit 126 provides the DL system 123 with a portion of the image 900 including the low-quality region 902 in order to improve the image quality of the low-quality region 902, and accepts a converted image in which the image quality of the low-quality region 902 has been improved. At this time, the DL system 123 generates a converted image by the following procedure.

The image 900 to be processed is divided into a plurality of blocks. The size of the block can correspond to a processing size in the DL system. In the present embodiment, since the image 900 is divided into three parts vertically and horizontally, the size of one block is 480×360 pixels. Some blocks include the high-quality region 901, but this is not a problem because the image of the high-quality region 901 is prioritized at the time of combination. The DL system 123 processes each block acquired from the conversion/reproduction control unit 126, converts the low-quality image into a high-quality image, and combines the post-conversion blocks to generate a converted image 904, which is provided to the conversion/reproduction control unit 126.

The conversion/reproduction control unit 126 combines the converted image 904 provided from the DL system 123 and the image of the high-quality region 901 cut out from the original image to be processed 900 to generate a combined image 930. This makes it possible to improve the image quality of the low-quality region 902 and generate a reproduced image with improved visibility.

Next, a flow of processing in the information processing apparatus 120 corresponding to the present embodiment will be described with reference to the flowchart of FIG. 10. Processes corresponding to the flowchart can be realized by, for example, one or more processors including the CPU 210 functioning as the conversion/reproduction control unit 126 and the DL system 123 executing corresponding programs (stored in the ROM 211, the HD 215, or the like). The processing is started when an image recorded in the image recording unit 124 is reproduced.

First, in step S1001, the conversion/reproduction control unit 126 acquires the header information 400 of the moving image to be reproduced. In the subsequent step S1002, the conversion/reproduction control unit 126 determines whether or not ADSR is being performed for the moving image to be reproduced. This determination is performed based on the value of the flag 401 of the acquired header information 400, and when the value of the flag 401 is 1, it means that ADSR is used and the processing proceeds to step S1003, and when the value of the flag 401 is 0, it means that ADSR is not used and the processing proceeds to step S1008.

In the subsequent step S1003, the conversion/reproduction control unit 126 determines whether the difference between the image quality of the specific region and the image quality outside the specific region is equal to or larger than a predetermined value. Specifically, the Q values 406 and 407 of the low-quality region and the high-quality region are acquired from the header information 400 acquired in step S1001, respectively, and it is determined whether or not the difference between the Q values is equal to or larger than a predetermined value. In the present embodiment, the predetermined value is 20. The value of the predetermined value can be arbitrarily set based on the relationship between the difference in image quality between the low-quality region and the high-quality region and the visibility of the reproduced image. When it is determined that the difference is equal to or larger than the predetermined value, the process proceeds to step S1004, and when it is determined that the difference is smaller than the predetermined value, the process proceeds to step S1008.

In step S1004, the conversion/reproduction control unit 126 determines whether or not the designation of the image-quality enhancement has been accepted. This determination can be made on the basis of whether or not the checkbox 803 is designated to be on in the setting screen 800 illustrated in FIG. 8A. If it is determined that the designation of image-quality enhancement is accepted, the process proceeds to step S1005, and if it is determined that the designation is not accepted, the process proceeds to step S1008.

Figure 9:
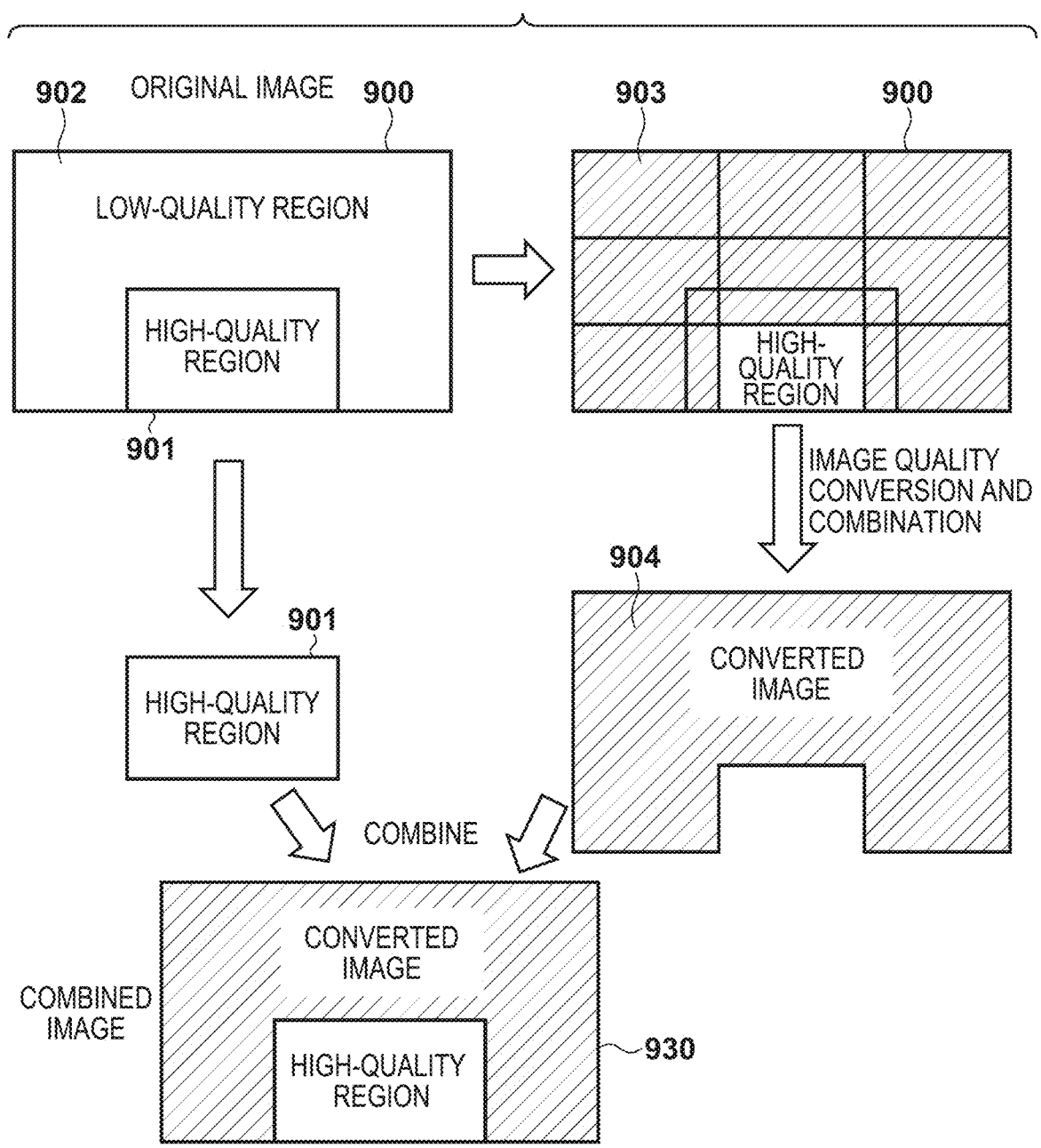
FIG. 9 is a diagram for explaining a method of generating a combined image according to the first embodiment.

In the subsequent step S1005, the conversion/reproduction control unit 126 divides the image to be processed into a plurality of blocks, provides the DL system 123 with a block including an image of a low-quality region, causes the DL system 123 to execute image quality conversion processing, and acquires a converted image, as described referring to FIG. 9. In the subsequent step S1006, the conversion/reproduction control unit 126 combines the converted image acquired from the DL system 123 and the image of the high-quality region of the image to be processed, which is the original image, to generate a combined image. In the subsequent step S1007, the image to be reproduced by the conversion/reproduction control unit 126 is set to be the combined image, and in step S1008, the image to be reproduced is set to be the original image not subjected to image quality conversion. In the subsequent step S1009, the conversion/reproduction control unit 126 outputs the image set as the image to be reproduced in step S1008 or step S1009 to the display unit 127, and causes the display unit 127 to display the reproduced image. In the subsequent step S1010, the conversion/reproduction control unit 126 determines whether there is an image to be displayed next, for example, a next frame image in the same moving image, and, if there is an image to be displayed, returns to the step S1002, and repeats the above-described process. On the other hand, if there is no image to be displayed, this process ends.

According to the embodiment described above, when, a portion of an image is high quality and the rest is low quality according to ADSR, and the image quality difference between the low-quality portion and the high-quality portion is so large that it makes viewing difficult, it is possible to make viewing easier by increasing the quality of the low quality portion.

Second Embodiment

Hereinafter, the second embodiment will be described. In the first embodiment described above, the DL system 123 performs the image quality conversion processing on the entire image in a region outside the specific region. On the other hand, in the present embodiment, the image quality conversion processing is performed on a region including a moving subject detected in the region.

What was described in relation to FIG. 1 to FIG. 7 also applies to the monitoring system according to the present embodiment. On the other hand, regarding the UI of the setting screen described with reference to FIG. 8A, the method of generating the combined image described with reference to FIG. 9, and the flow of processing described with reference to FIG. 10, parts specific to the present embodiment will be described below with reference to FIG. 11 to FIG. 13.

Figure 11A:
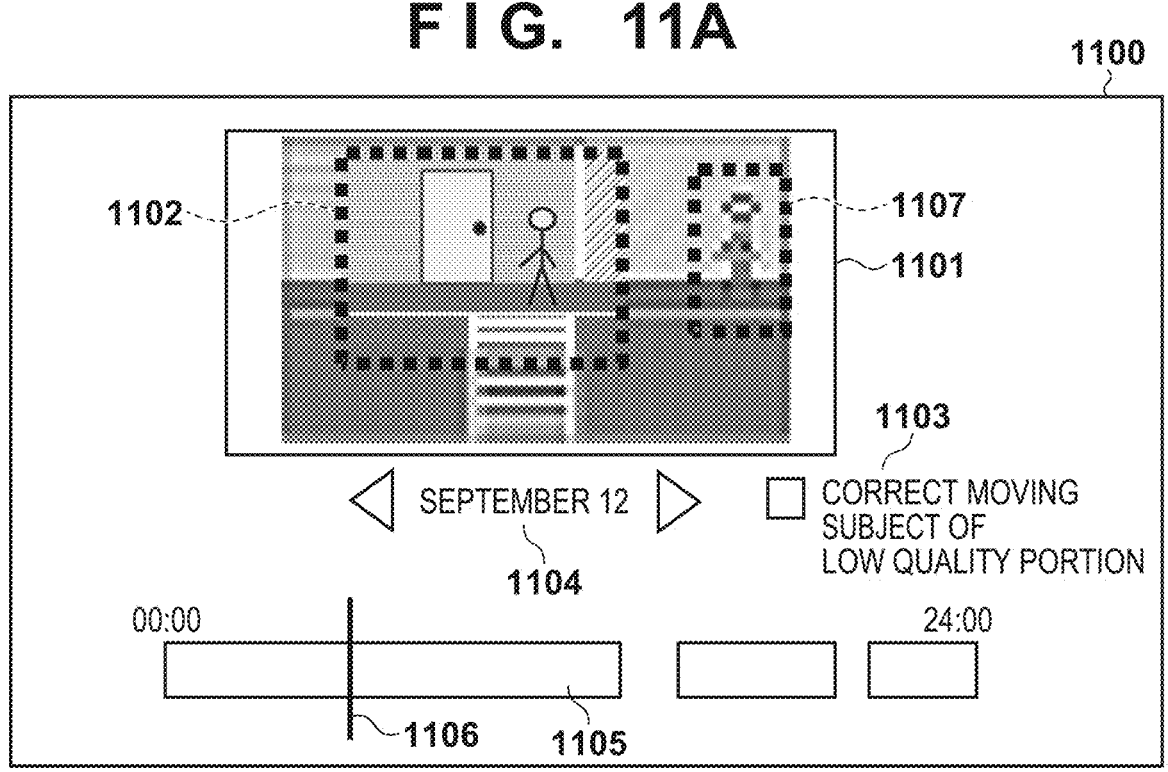
FIG. 11A and FIG. 11B are diagrams for illustrating a setting screen example corresponding to a second embodiment.
Figure 11B:
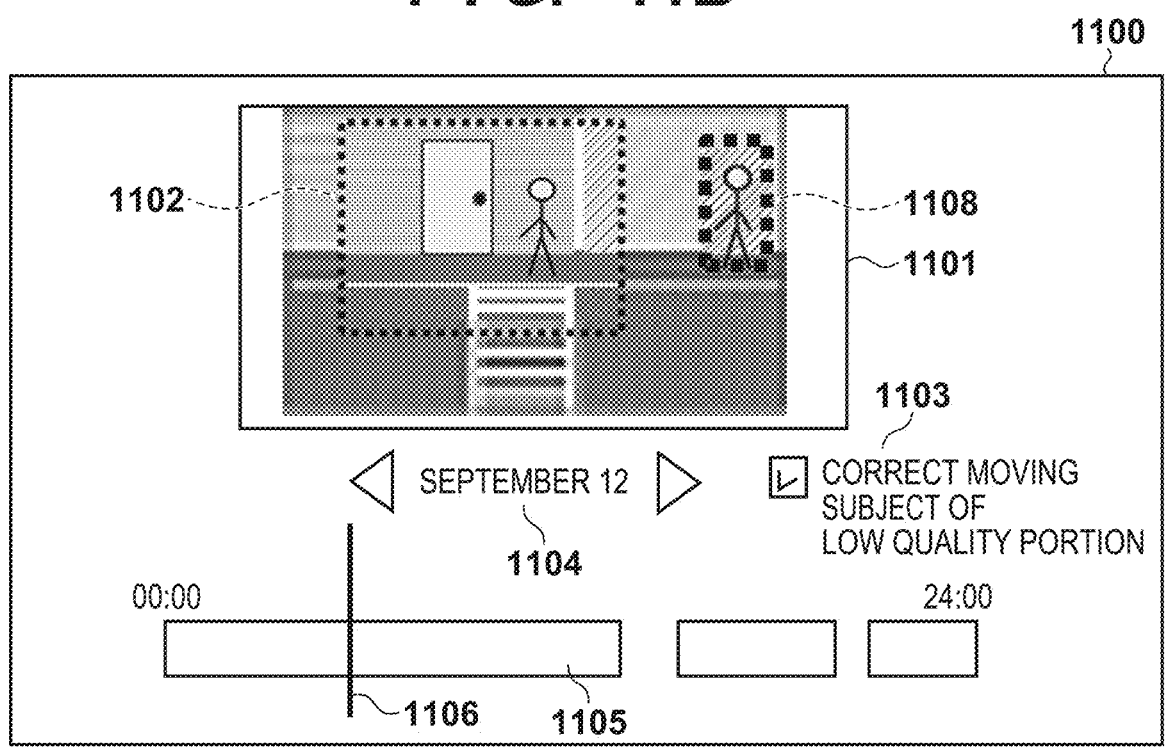

FIG. 11 illustrates an example of a setting screen at a time of performing settings on the information processing apparatus 120, which corresponds to the present embodiment. Elements denoted by reference numerals 1100 to 1106 in FIG. 11A and FIG. 11B correspond to elements denoted by reference numerals 800 to 806 in FIG. 8A, and therefore descriptions thereof are omitted. In the screens of FIG. 11A and FIG. 11B, a moving subject (a passing person here) detected in a region outside the region 1102 in which a high-quality image is displayed, is surrounded by a dotted line 1107. In the present embodiment, the region 1107 including the moving subject detected outside the region 1102 is set as a region for which to perform image quality conversion processing. The reason why the image quality is increased only for the moving subject in this manner is that the difference between the moving subject and the high-quality portion is particularly noticeable when the moving subject has a low quality, so that ease of viewing is impaired and it looks unnatural. Therefore, in the present embodiment, by performing the image quality conversion processing focusing on the moving subject, the difference in image quality between the low quality portion and the high quality portion is improved.

In FIG. 11A, since the checkbox 1103 is off, the recorded image is displayed as it is. At this time, the quality of the region surrounded by the dotted line 1107 remains low. On the other hand, in FIG. 11B, the checkbox 1103 is on, and the image quality of the region surrounded by the dotted line 1108 is converted by the DL system 123 to be high quality. At this time, the regions outside the regions 1102 and 1108 are displayed at low quality as recorded images. In this manner, in the present embodiment, by selectively increasing the quality of the region including the moving subject detected in the low-quality region, it is possible to efficiently alleviate the difficulty in viewing the image.

Figure 12:
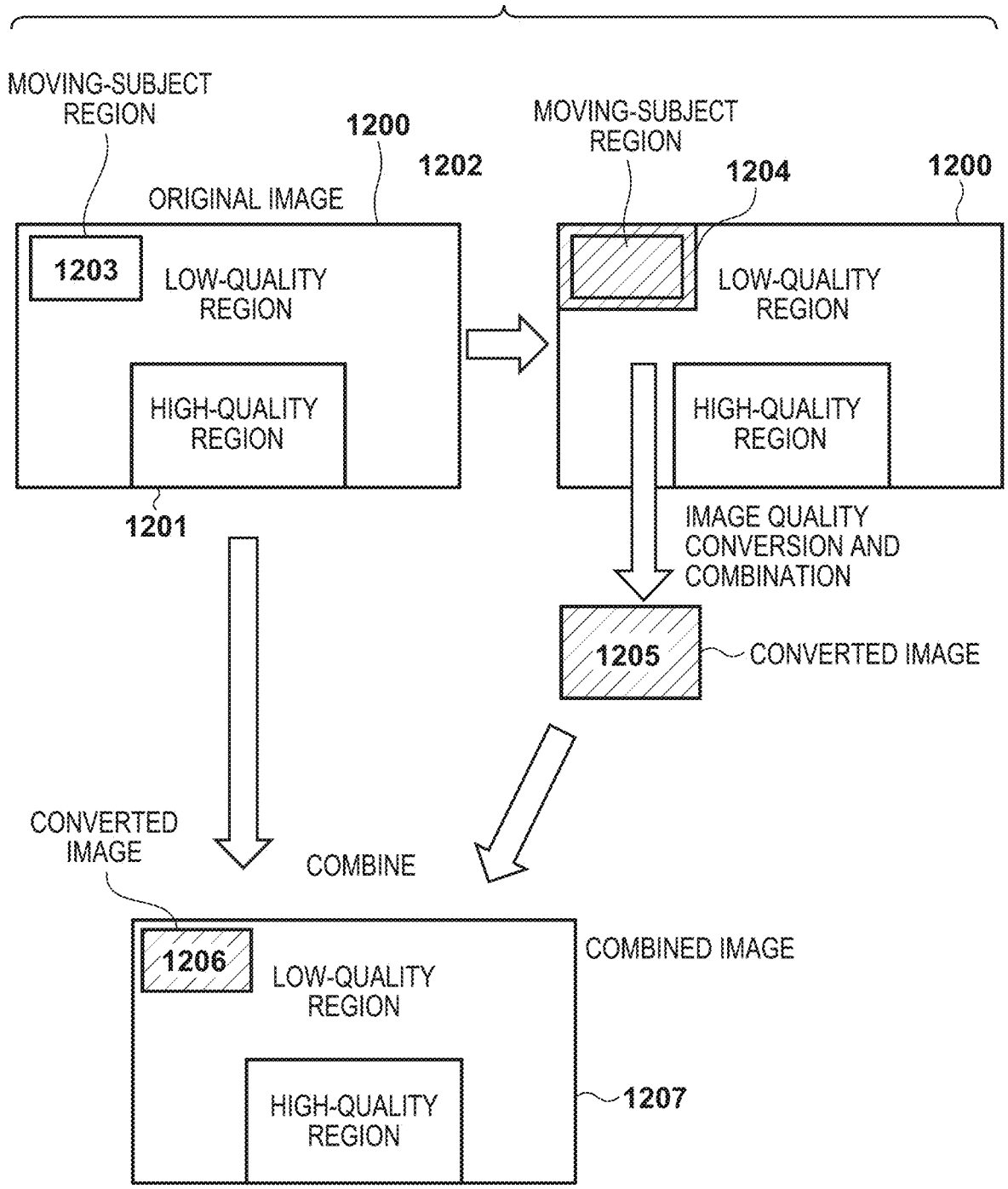
FIG. 12 is a diagram for explaining a method of generating a combined image according to the second embodiment.

Next, an example of image conversion processing in the conversion/reproduction control unit 126 corresponding to the present embodiment will be described with reference to FIG. 12. An image 1200 is an image for one frame to be processed, and can be regarded as one frame image after decoding the image recorded in the image recording unit 124. The image 1200 includes a high-quality region 1201 and a low-quality region 1202. The low-quality region 1202 includes a moving-subject region 1203 including a moving subject detected by the moving-subject detection unit 128.

When the checkbox 1103 is set to on in the setting screen 1100 of FIG. 11A described above, the conversion/reproduction control unit 126 provides the DL system 123 with a block image 1204 including the moving-subject region 1203 in order to improve the image quality of the moving-subject region 1203 detected in the low-quality region 1202, and accepts the converted image 1205 resulting from the image quality improvement. The image 1200 to be processed is divided into a plurality of blocks similarly to in the first embodiment, and only blocks including the moving-subject region are provided to the DL system 123. If the detected moving subject does not fit in a single block, multiple block images are provided. When the conversion/reproduction control unit 126 acquires the converted image 1205, the conversion/reproduction control unit 126 cuts out a portion 1206 corresponding to the moving-subject region from the image and combines it with the original image 1200 to generate a combined image 1207. This makes it possible to improve the image quality of the moving-subject region in the low-quality region 1202 and generate a reproduced image with improved visibility.

A flow of processing in the information processing apparatus 120 corresponding to the present embodiment will be described with reference to the flowchart of FIG. 13. Processes corresponding to the flowchart can be realized by, for example, one or more processors including the CPU 210 functioning as the conversion/reproduction control unit 126 and the DL system 123 executing corresponding programs (stored in the ROM 211, the HD 215, or the like). The processing is started when an image recorded in the image recording unit 124 is reproduced.

Figure 10:
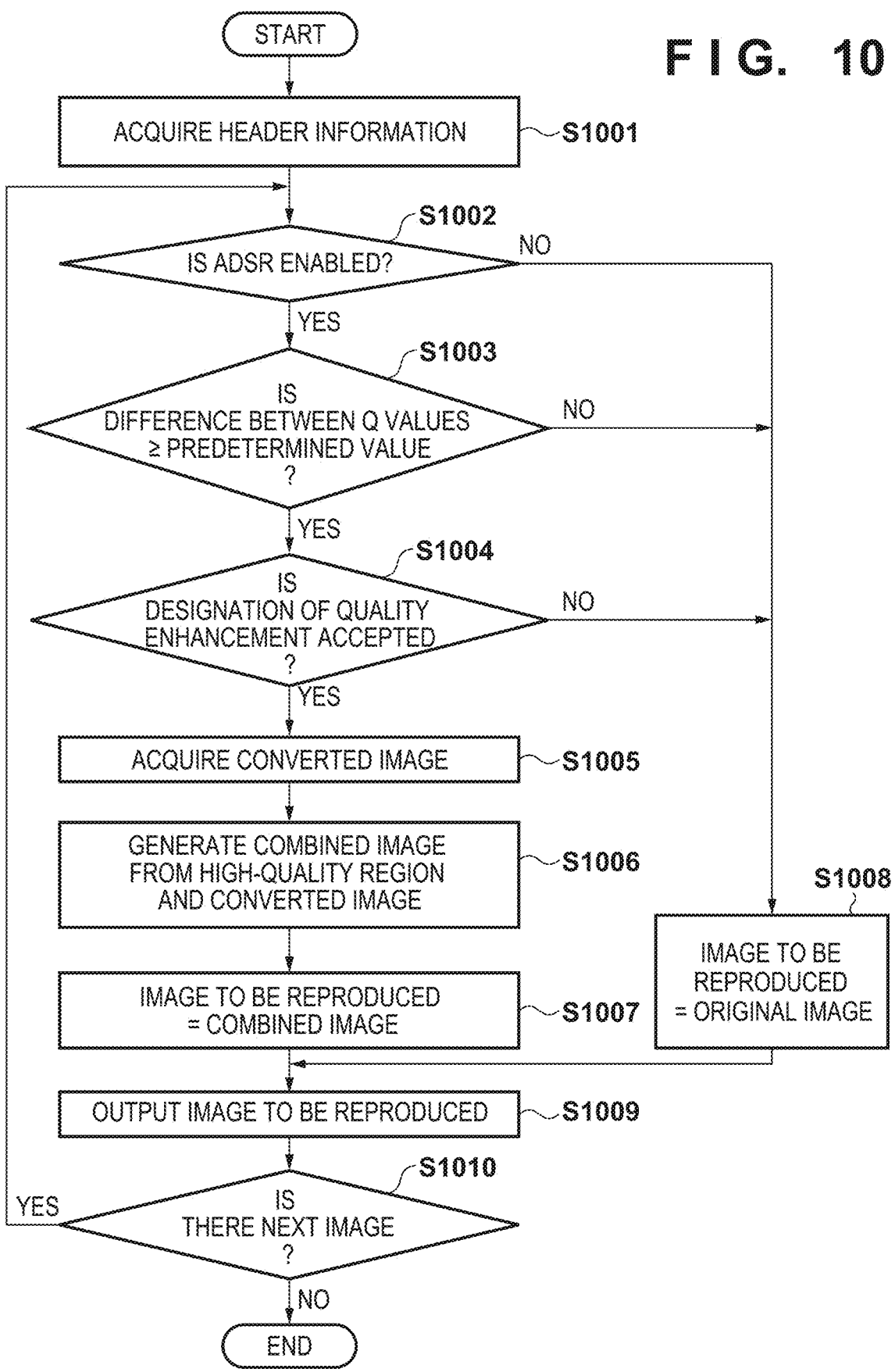
FIG. 10 is a flowchart illustrating an example of processing corresponding to the first embodiment.
Figure 13:
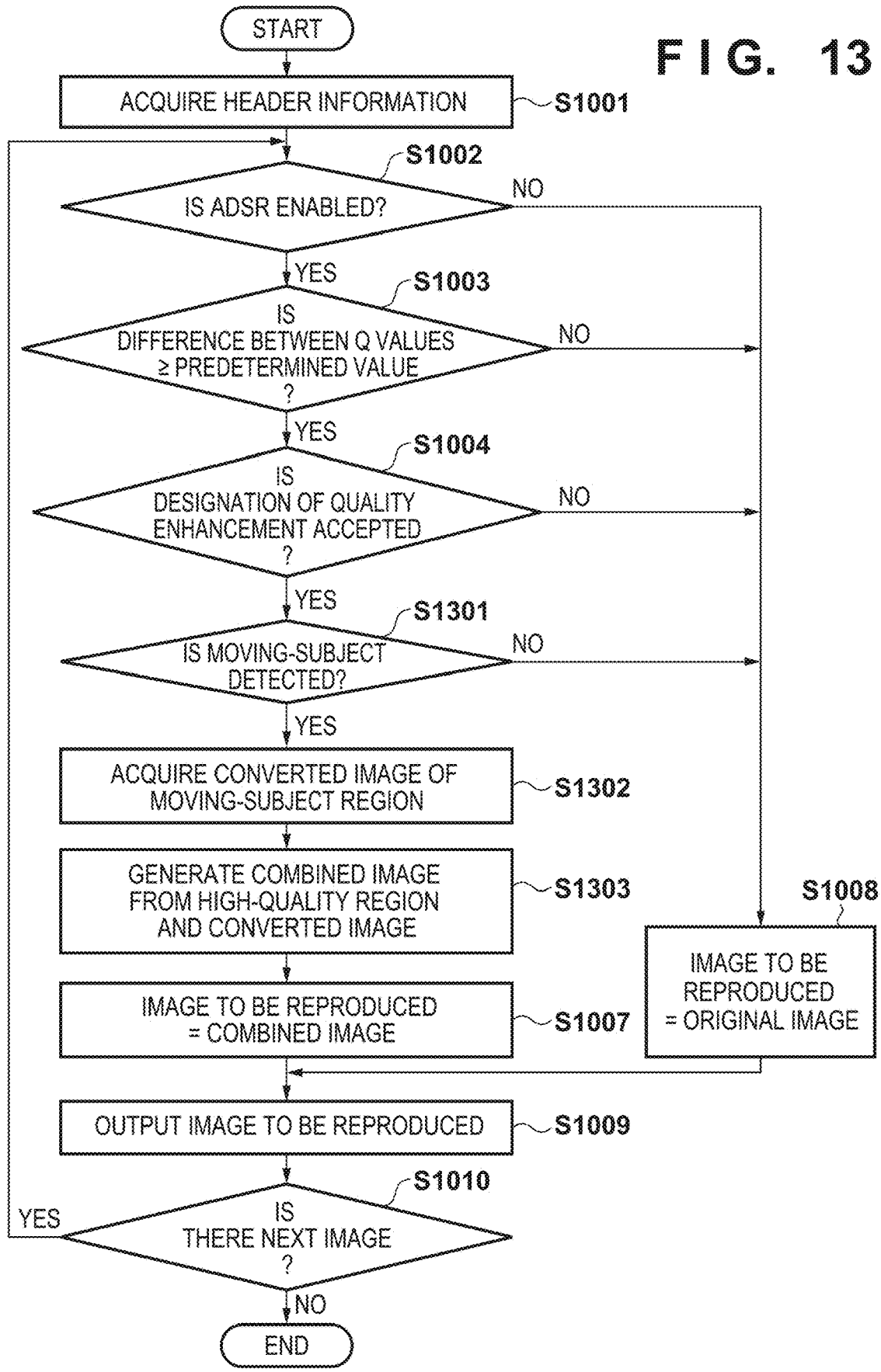
FIG. 13 is a flowchart illustrating an example of processing corresponding to the second embodiment.

In the flowchart of FIG. 13, substantially the same processing as in the flowchart of FIG. 10 is executed except for a portion of the processing. Therefore, steps corresponding to those in FIG. 10 are denoted by the same reference numerals. Since the processing in these steps is described in the first embodiment, description thereof is omitted here.

When, in step S1004, the conversion/reproduction control unit 126 determines that the designation of the image-quality enhancement has been accepted, the process proceeds to step S1301. In step S1301, the conversion/reproduction control unit 126 acquires from the moving-subject detection unit 128 information as to whether or not a moving subject is included in the image to be processed. The moving-subject detection unit 128 acquires an image to be processed in parallel with the conversion/reproduction control unit 126 from the image recording unit 124, and detects the presence of a moving subject in a low-quality region. When the moving-subject detection unit 128 detects a moving subject in a low-quality region, the moving-subject detection unit 128 sets a region including the moving subject, and notifies the conversion/reproduction control unit 126 of positional information. The moving-subject detection unit 128 can detect the moving subject by taking a difference between temporally adjacent images or by taking a difference between a background image prepared in advance and the image to be processed.

When it is determined that a moving subject is detected in the low-quality region, the processing proceeds to step S1302. On the other hand, if it is determined that no moving subject is detected, the process proceeds to step S1008. In step S1302, as described with reference to FIG. 12, the conversion/reproduction control unit 126 divides the image to be processed into blocks based on the moving-subject region including the moving subject detected by the moving-subject detection unit 128, provides the blocks to the DL system 123, causes the DL system 123 to execute the image quality conversion process, and acquires the converted image. In the subsequent step S1303, the conversion/reproduction control unit 126 combines the converted image of blocks including the moving-subject region acquired from the DL system 123 and the original image to generate a combined image. Thereafter, the process proceeds to step S1007.

Above, the case where image quality improvement is performed on only a moving-subject region in the low-quality region has been described. On the other hand, in the case where a region other than a moving-subject region in the low-quality region is an image that is fixed in advance, for example, the background image in the case where motion detection is performed using the background image, the resolution of the background image can be increased in advance. When the converted image of the moving-subject region is acquired from the DL system 123 in step S1302, a converted image of the entire low-quality region may be generated by combining the background image, whose resolution was increased in advance, with the converted image of the moving-subject region. In this case, since the background image can be repeatedly used once the increased-resolution image has been generated, the processing load only increases for the combining of the converted image of the moving-subject region and the background image, which is not particularly problematic on the whole.

As described above, according to the present embodiment, the appearance of the image can be efficiently improved by increasing the quality of only the moving subject without performing the image quality conversion processing on the whole of the low-quality region.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-234705 filed on Dec. 14, 2018 which is hereby incorporated by reference herein in its entirety.

What is claimed is:

1. An information processing apparatus, comprising one or more memories storing instructions and one or more processors which execute the instructions stored in the one or more memories to function as:
   a determination unit configured to, for a target image including a first region having a first image quality relating to a compression ratio and a second region other than the first region having a second image quality with a higher compression ratio than the first image quality, determine whether or not a difference in image quality between the first image quality and the second image quality is equal to or larger than a predetermined value;
   a conversion unit configured to, in a case where the determination unit determines that the difference between the first image quality and the second image quality is equal to or larger than the predetermined value, convert the target image of the second region into an image having a third image quality higher than the second image quality;
   a combining unit configured to generate a combined image by using a post-conversion image having the third image quality and the image of the first region; and
   an outputting unit configured to, in a case where the determination unit determines that the difference between the first image quality and the second image quality is less than the predetermined value, output the target image, and in a case where the determination unit determines that the difference between the first image quality and the second image quality is equal to or larger than the predetermined value, output the combined image.

2. The information processing apparatus according to claim 1, wherein the one or more processors which execute the instructions stored in the one or more memories to further function as:
   an acceptance unit configured to accept a designation to convert the target image by the conversion unit,
   wherein the determination unit performs a determination in a case where the acceptance unit has accepted the designation.

3. The information processing apparatus according to claim 1, wherein the one or more processors which execute the instructions stored in the one or more memories to further function as:
   a detection unit configured to detect a moving subject in the second region,
   wherein the conversion unit converts an image of a region that is a portion of the second region and that includes the detected moving subject into the target image having the third image quality, and
   the combining unit generates the combined image using the post-conversion image having the third image quality and the image to be processed.

4. The information processing apparatus according to claim 3, wherein
   the combined image includes
   the first region which has the first image quality, and
   the second region in which the region of the portion including the detected moving subject has the third image quality and in which the region other than the region of the portion has the second image quality.

5. The information processing apparatus according to claim 1, wherein the one or more processors which execute the instructions stored in the one or more memories to further function as:
   a detection unit configured to detect a moving subject, in the second region, based on a difference from a background image,
   wherein the conversion unit converts an image of a region that is a portion of the second region that includes the detected moving subject into the target image having the third image quality, and
   the combining unit generates the combined image using the post-conversion image having the third image quality, the background image converted to the third image quality in advance, and the image of the first region.

6. The information processing apparatus according to claim 1, wherein the combined image includes the first region having the first image quality and the second region having the third image quality.

7. The information processing apparatus according to claim 1, wherein the conversion unit performs a conversion using a method of converting the image quality of a second image learned by machine learning based on combinations of a first image having the first image quality and the second image having the second image quality.

8. The information processing apparatus according to claim 7, wherein the machine learning is based on pix2pix.

9. A system comprising:
   an image capturing apparatus configured to generate, from an image obtained by capturing a predetermined space, a target image including a first region having a first image quality and a second region other than the first region and having a second image quality lower than the first image quality; and
   an information processing apparatus configured to generate a combined image by processing the target image, the information processing apparatus comprising one or more memories storing instructions and one or more processors which execute the instructions stored in the one or more memories to function as:
   a determination unit configured to, for the target image including the first region having the first image quality relating to a compression ratio and the second region other than the first region having the second image quality with a higher compression ratio than the first image quality, determine whether or not a difference in image quality between the first image quality and the second image quality is equal to or larger than a predetermined value;

a conversion unit configured to, in a case where the determination unit determines that the difference between the first image quality and the second image quality is equal to or larger than the predetermined value, convert the target image of the second region into an image having a third image quality higher than the second image quality;

a combining unit configured to generate the combined image by using a post-conversion image having the third image quality and the image of the first region; and an outputting unit configured to, in a case where the determination unit determines that the difference between the first image quality and the second image quality is less than the predetermined value, output the target image, and in a case where the determination unit determines that the difference between the first image quality and the second image quality is equal to or larger than the predetermined value, output the combined image.

10. A method for controlling an information processing apparatus, the method comprising:

for a target image including a first region having a first image quality relating to a compression ratio and a second region other than the first region having a second image quality with a higher compression ratio than the first image quality, determining whether or not a difference in image quality between the first image quality and the second image quality is equal to or larger than a predetermined value;

in a case where it is determined that the difference between the first image quality and the second image quality is equal to or larger than the predetermined value, converting the target image of the second region into an image having a third image quality higher than the second image quality;

generating a combined image by using a post-conversion image having the third image quality and the image of the first region; and outputting the target image, in a case where it is determined that the difference between the first image quality and the second image quality is less than the predetermined value, and outputting the combined image, in a case where it is determined that the difference between the first image quality and the second image quality is equal to or larger than the predetermined value.

11. A non-transitory computer-readable storage medium storing one or more programs including instructions that, when executed by a processor of an information processing apparatus, causes the processor, to perform operations of:

for a target image including a first region having a first image quality relating to a compression ratio and a second region other than the first region having a second image quality with a higher compression ratio than the first image quality, determining whether or not a difference in image quality between the first image quality and the second image quality is equal to or larger than a predetermined value;

in a case where it is determined that the difference between the first image quality and the second image quality is equal to or larger than the predetermined value, converting the target image of the second region into an image having a third image quality higher than the second image quality;

generating a combined image by using a post-conversion image having the third image quality and the image of the first region; and outputting the target image, in a case where it is determined that the difference between the first image quality and the second image quality is less than the predetermined value, and outputting the combined image, in a case where it is determined that the difference between the first image quality and the second image quality is equal to or larger than the predetermined value.

* * * * *